E. A. DOTY.
NUT LOCK.
APPLICATION FILED NOV. 7, 1913.
1,133,843.
Patented Mar. 30, 1915.
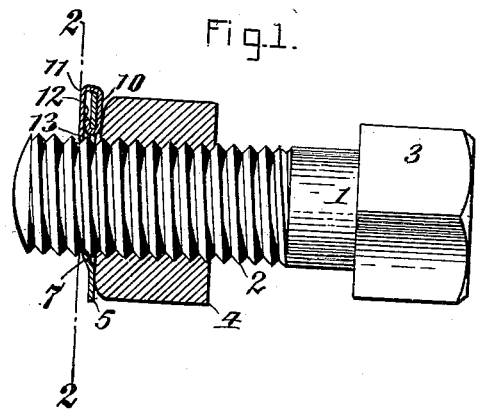
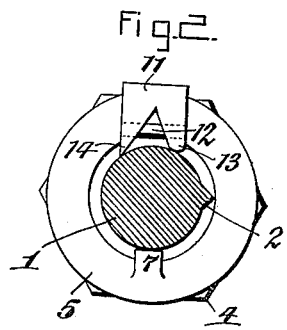
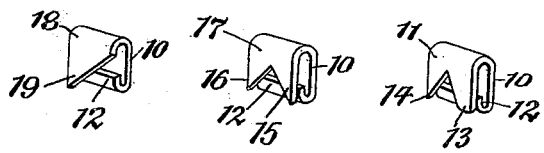
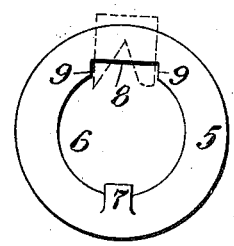
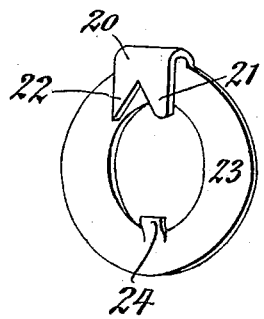
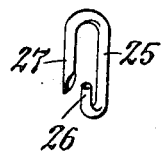
WITNESSES
INVENTOR.
Edwin A. Doty
by Geyer & Popp
ATTORNEYS.

UNITED STATES PATENT OFFICE.

EDWIN A. DOTY, OF ALBANY, NEW YORK.

NUT-LOCK.

1,133,843.  Specification of Letters Patent. Patented Mar. 30, 1915.

Application filed November 7, 1913. Serial No. 799,718.

*To all whom it may concern:*

Be it known that I, EDWIN A. DOTY, a citizen of the United States, residing at Albany, in the county of Albany and State of New York, have invented new and useful Improvements in Nut-Locks, of which the following is a specification.

This invention relates to a nut lock of that type which is provided with a spur adapted to be driven into the screw shank of the bolt between two of its threads for the purpose of preventing backward rotation of the nut on the bolt.

It is the object of this invention to provide a nut lock of this character which is comparatively simple and inexpensive in construction, which can be readily and quickly applied to a bolt for holding the nut thereon in place and which permits further tightening of the nut and the lock to be easily effected after the lock has been once secured without impairing the efficiency of the same.

In the accompanying drawings: Figure 1 is a longitudinal sectional elevation of a nut and bolt provided with one form of nut lock embodying my improvements. Fig. 2 is a transverse section of the same taken in line 2—2, Fig. 1. Fig. 3 is a detached side elevation of the body of the nut lock shown in Figs. 1 and 2. Fig. 4 is a detached perspective view of the clip forming part of the nut lock shown in Figs. 1 and 2. Fig. 5 is a similar view showing a slightly different form of clip from that shown in Fig. 4. Fig. 6 is a similar view showing still another form of clip or fastener embodying my invention and capable of use in connection with the body shown in Figs. 1, 2 and 3. Fig. 7 is a perspective view showing still another form of nut lock constructed in accordance with my invention. Fig. 8 is a perspective view showing another form of clip or fastener coming within the scope of my invention.

Similar characters of reference indicate corresponding parts throughout the several views.

1 represents the shank of an ordinary bolt provided with external screw threads 2 at one end and a head 3 at the other end, and 4 represents the nut which engages with the thread of the shank and is adapted to be held against backward rotation on the shank.

Although the nut lock containing my invention may be variously constructed it is preferable to make the same of sheet metal inasmuch as the same in this form can be produced at comparatively low cost.

My invention may be embodied in various forms, that shown in Figs. 1, 2, 3 and 4 being constructed as follows: 5 represents an annular or ring-shaped body having an opening 6 the diameter of which is equal to the diameter of the outer edges of the threads of the bolt shank so that this body may be slipped over the threaded portion of the same. On one side of its opening the nut lock body is provided with an inwardly projecting retaining lug 7 which is preferably set-off outwardly from the body and on its opposite side the bore of this opening of the body is provided with a notch or recess 8 forming two shoulders 9, 9 at opposite ends of the notch in a direction circumferentially of the body. This notched portion of the nut lock body is embraced by a clip or fastener which is constructed to engage the threaded part of the bolt shank and hold the nut against backing up. In its preferred form this clip comprises a web 10 arranged along one side of the lock body, preferably the advancing side, a lip 12 arranged in the notch 8 of the body and connected with the lower end of the web and projecting outwardly along the opposite or trailing side of the body, and a plate 11 connected with the outer edge of the web and extending over the adjacent edge portion of the body and inwardly along the same side of the body on which the lip is arranged and provided at its inner end with two spurs 13, 14. These spurs are arranged side by side in a direction circumferentially of the opening in the lock body and the front or advancing spur 13 is provided with a blunt or dull inner end while the rear or trailing spur 14 is provided with a sharp or pointed inner end, as shown in Figs. 2 and 4. The inner ends of the two spurs of the clip project across the adjacent portion of the body opening so that the same together with the retaining lug 7 on the opposite side of the body in effect form an internal thread whereby this nut lock may be screwed forwardly upon the thread of the bolt shank until the advancing side of the nut lock bears tightly against the rear or trailing end of the nut 4. After being thus tightened the spurs of the clip are driven inwardly against the threaded part of the bolt shank by delivering the blow of the hammer or similar instrument against the outer part of the spur plate of the clip, thereby causing the sharpened rear spur to be driven more or less into the threaded bolt shank and preventing backward rotation of the nut lock on the bolt shank and holding the nut against backing up thereon. Upon driving the spurs of the clip inwardly the front or advancing spur owing to its dull or blunt inner end does not enter the metal of the bolt shank. The nut lock is therefore free to be turned forwardly on the screw shank for following up the nut if the latter requires further tightening, after which the nut lock may be again secured in place by another blow against the spur plate which will cause its sharpened rear spur to again dig into the screw shank. It will therefore be apparent that while this nut lock is incapable of backward motion after being once tightened the same is free to be moved forward and further tightened against the nut if this should become necessary inasmuch as the blunt ended front spur of the spur plate prevents this spur from digging into the screw shank and holding the body of the nut lock against forward rotation.

The body of the nut lock is preferably stamped out of sheet metal and the clip is also constructed of a strip of sheet metal which is doubled upon itself in the manner shown. The body is preferably constructed of soft metal such as sheet iron while the clip is preferably constructed of a harder metal such as sheet steel. By thus constructing the body and clip of the nut lock in two pieces a low priced metal may be employed for the body inasmuch as the same is not subjected to any severe strains and the higher priced metal may be employed for the clip which is subjected to harder usage by reason of its points being driven against the screw shank, thereby enabling the nut lock to be produced at much lower cost than if the entire structure were made of one piece because in that case the body as well as the spurs would have to be made of a higher priced hard material.

Although my improved nut lock is represented in Figs. 1 and 2 with the spurs on the trailing side of the body the lug 11 can be bent across the opposite side of the body so that the spurs are arranged on the advancing side of the body. It is preferable, however, to apply the nut lock on the screw shank with the spurs on the trailing side of the body inasmuch as the spurs in this position of the parts can be driven more readily against the threaded part of the bolt shank.

If desired, both the front and rear spurs 15, 16 of the spur plate 17 may be provided with sharpened or pointed inner ends, as shown in Fig. 5 which construction is suitable for use where the lock should be held both against forward and backward rotation on the bolt after being once applied. For some purposes it will also suffice to provide the spur plate 18 with only a single spur 19 which is arranged to trail and provided with a sharpened inner end for engagement with the screw shank, as shown in Fig. 6.

When the cost of material is not an element to be taken into consideration the spur plate 20 having a dull front spur 21 and a pointed rear spur 22 may be formed in one piece with the outer portion of the lock body 23 opposite the retaining lug 24, as shown in Fig. 7.

Instead of constructing the clip of sheet metal, as shown in Figs. 1, 2, 4, 5 and 6 the same may be constructed of round wire, as shown in Fig. 8, which last mentioned construction comprises a web 25 adapted to engage with one side of the lock body, an outwardly turned lip 26 adapted to project through the notch of the body and engage with the opposite side thereof, and a single spur 27 projecting from the outer edge of said web inwardly along the last mentioned side of the lock body, so that it operates in substantially the same manner as the construction of clip shown in Fig. 6.

The various forms of nut lock here shown and containing various modifications of my improvement can all be constructed at very low cost by the employment of low priced materials and unskilled help, thereby enabling these goods to be marketed at a price which is not prohibitive but permits of using the same extensively, particularly for railroad purposes. This nut lock can also be very conveniently applied to the bolts without any special tools for this purpose and after being once put in place the same afford absolute security against loosening of the nut on the bolt.

I claim as my invention:

1. A nut lock comprising a perforated body adapted to receive the threaded shank of a bolt and provided with a plate having two inwardly projecting spurs arranged circumferentially about the opening of the body, the front or advancing spur having a blunt or dull inner end and the rear or trailing spur having a sharp or pointed inner end, whereby upon driving the plate inwardly the dull spur supports the sharp spur and causes the latter to enter the bolt for preventing backward rotation of the lock on the bolt while permitting forward rotation thereof.

2. A nut lock comprising a perforated body adapted to receive the threaded shank of a bolt and provided with an inwardly turned plate having two inwardly projecting spurs arranged side by side circumferentially around said opening the front or advancing spur having a blunt or dull inner end while the rear or trailing spur has a sharp or pointed inner end, whereby upon driving the plate inwardly the dull spur supports the sharp spur and causes the latter to enter the bolt for preventing backward rotation of the lock on the bolt while permitting forward rotation thereof.

3. A nut lock comprising a body having an opening adapted to receive the threaded shank of a bolt, and a clip embracing said body and having a web on one side of the body, a lip arranged on the inner end of the web and projecting outwardly along the opposite side of the body, and a spur arranged on the outer end of the web and projecting inwardly along the last mentioned side of the body and adapted to engage the thread of the bolt.

4. A nut lock comprising a body having an opening adapted to receive the threaded shank of a bolt, and a clip embracing said body and having a web on one side of the body, a lip arranged on the inner end of the web and projecting outwardly along the opposite side of the body, and a spur arranged on the outer end of the web and projecting inwardly along the last mentioned side of the body and adapted to engage the thread of the bolt, said body being provided in its bore or inner edge with a notch which receives the lip of said clip.

5. A nut lock comprising a body having an opening adapted to receive the threaded shank of a bolt, and a clip embracing said body and having a web on one side of the body, a lip arranged on the inner end of the web and projecting outwardly along the opposite side of the body and two spurs arranged side by side on the outer end of the web and projecting inwardly therefrom along the last mentioned side of the body and adapted to engage the thread of the bolt, the front or advancing spur having a dull or blunt inner end while the rear or trailing spur has a sharp or pointed inner end.

Witness my hand this 5th day of November, 1913.

EDWIN A. DOTY.

Witnesses:
WILLIAM SCOTT,
GEO. F. PRILIPPER.